(12) United States Patent
Li et al.

(10) Patent No.: US 10,866,833 B2
(45) Date of Patent: Dec. 15, 2020

(54) METHOD AND APPRATUS FOR IMPLEMENTING MICROKERNEL ARCHITECTURE OF INDUSTRIAL SERVER

(71) Applicant: KYLAND TECHNOLOGY CO., LTD, Beijing (CN)

(72) Inventors: Ping Li, Beijing (CN); Zhiwei Yan, Beijing (CN); Qiyun Jiang, Beijing (CN); Xueqiang Qiu, Beijing (CN); Xingpei Tang, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 59 days.

(21) Appl. No.: 16/243,414

(22) Filed: Jan. 9, 2019

(65) Prior Publication Data

US 2020/0012519 A1 Jan. 9, 2020

(30) Foreign Application Priority Data

Jul. 9, 2018 (CN) .......................... 2018 1 0745308
Nov. 1, 2018 (CN) .......................... 2018 1 1296334

(51) Int. Cl.
*G06F 9/48* (2006.01)
*G05B 19/05* (2006.01)
*G06F 9/50* (2006.01)

(52) U.S. Cl.
CPC ........... *G06F 9/4881* (2013.01); *G05B 19/05* (2013.01); *G06F 9/5077* (2013.01); *G05B 2219/15053* (2013.01)

(58) Field of Classification Search
CPC ................. G06F 9/5077; G06F 9/4881; G06F 2209/5021; G06F 2209/506; G05B 19/05; G05B 2219/15053
See application file for complete search history.

(56) References Cited

U.S. PATENT DOCUMENTS 5,515,538 A * 5/1996 Kleiman ............... G06F 9/4812
710/260
7,140,015 B1 * 11/2006 Bhanjois ................ G06F 9/546
718/100

(Continued)

FOREIGN PATENT DOCUMENTS

CN 102193853 A 9/2011
CN 107479943 A 12/2017

(Continued)

OTHER PUBLICATIONS

Guillaume Millet, Extended European Search Report, EP Application No. 19151212, dated Aug. 19, 2019, 10 pages, European Patent Office, Munich Germany.

*Primary Examiner* — Tuan C Dao
(74) *Attorney, Agent, or Firm* — Crain Caton and James

(57) ABSTRACT

Provided is a method and apparatus for implementing microkernel architecture of industrial server. The method includes calculation of dependency of control programs according to a microkernel task type weight and a microkernel task priority weight and/or a control program running time weight prior to startup of a system, and determination of the number of the control programs running on each physical core and each control program running on multiple physical cores according to the dependency.

18 Claims, 8 Drawing Sheets

(56) References Cited

U.S. PATENT DOCUMENTS

| | | | |
|---|---|---|---|
| 2003/0033345 A1* | 2/2003 | Keefer | G06F 9/5072 718/102 |
| 2006/0184942 A1* | 8/2006 | Cox | G06F 9/52 718/100 |
| 2008/0104600 A1* | 5/2008 | May | G06F 9/524 718/103 |
| 2010/0251265 A1* | 9/2010 | Hodson | G06F 9/5077 719/319 |
| 2011/0225583 A1 | 9/2011 | Suh et al. | |
| 2012/0324449 A1* | 12/2012 | Huetter | G06F 9/5066 718/1 |
| 2013/0097355 A1* | 4/2013 | Dang | G06F 9/45558 711/6 |
| 2014/0165077 A1 | 6/2014 | Martinez | |

FOREIGN PATENT DOCUMENTS

| | | |
|---|---|---|
| CN | 10896501 A | 6/2018 |
| EP | 3425503 A1 | 1/2019 |
| EP | 3502901 A1 | 6/2019 |

* cited by examiner

METHOD AND APPRATUS FOR IMPLEMENTING MICROKERNEL ARCHITECTURE OF INDUSTRIAL SERVER

CROSS-REFERENCE TO RELATED APPLICATIONS

This application claims priority to a Chinese patent application No. 201811296334.2 filed on Nov. 1, 2018. the contents of both of which are incorporated herein by reference in their entireties.

TECHNICAL FIELD

The embodiments of the present disclosure relates to the technical field of industrial servers and, in particular, to a method and apparatus for implementing microkernel architecture of an industrial server.

BACKGROUND

A virtual operating system (e.g., Core i7) based on industrial server hardware supports four physical cores. One virtual machine, that is, one micro-control kernel including a Programmable Logic Controller (PLC), runs on each core.

However, that only one PLC can run on one core wastes resources and also limits executable functions. In addition, the scheduling mode of multi-core PLC includes a priority-based scheduling algorithm applied in service scenarios with high real-time requirements and a timetable-based scheduling algorithm applied in service scenarios with low real-time requirements. In a scenario with complex service requirements, any of the above scheduling algorithms can hardly meet users' service requirements and would cause low utilization of CPU resources.

SUMMARY

The embodiments of the present disclosure provide a method and apparatus for implementing microkernel architecture of an industrial server, to achieve the real-time control and free combination of microkernels of the industrial server at the industrial site layer.

Embodiments of the present disclosure provide a method for implementing microkernel architecture of industrial server, where the method is applied to an industrial server, an operating system kernel based on industrial server hardware supports a plurality of physical cores, and the method includes the following steps:

operating an operating system kernel to generate scheduling configuration information according to a microkernel task type weight and a microkernel task priority weight and/or a control program running time weight corresponding to each control program of a plurality of control programs prior to startup of a system, where the scheduling configuration information includes the number of control programs of the multiple control programs running on each physical core, a scheduling algorithm for all the control programs running on each physical core, and at least one control program of the plurality of control programs running on more than one of the plurality of physical cores;

operating the operating system microkernel to configure the plurality of control programs running on the operating system kernel according to the scheduling configuration information; and operating the operating system microkernel to start the configured control programs.

In an embodiment, the step of operating the operating system kernel to generate the scheduling configuration information according to the microkernel task type weight and the microkernel task priority weight and/or the control program running time weight corresponding to each control program of the plurality of control programs includes:

calculating dependency of the multiple control programs according to the microkernel task type weight and the microkernel task priority weight and/or the control program running time weight corresponding to each control program; and generating the scheduling configuration information according to the dependency.

In an embodiment, the step of calculating the dependency of the multiple control programs according to the microkernel task type weight and the microkernel task priority weight and/or the control program running time weight corresponding to each control program includes:

calculating the dependency according to the microkernel task type weight, the microkernel task priority weight and the control program running time weight; or calculating the dependency according to the microkernel task type weight and the microkernel task priority weight; or calculating the dependency according to the microkernel task type weight and the control program running time weight.

In an embodiment, the step of operating the operating system kernel to configure control programs running on the operating system kernel according to the scheduling configuration information includes:

virtualizing hardware through a virtual machine monitoring program, and configuring more than one of the control programs on at least one of the plurality of physical cores according to the scheduling configuration information; and/or configuring the scheduling algorithm for all the control programs running on the each physical core according to the scheduling configuration information, wherein the scheduling algorithm comprises a timetable-based scheduling algorithm or a priority-based scheduling algorithm; and/or virtualizing the plurality of physical cores, obtaining at least two control programs from each of the at least one control program and configuring the obtained at least two control programs originating from each of the at least one control program on more than one of the plurality of physical cores according to the scheduling configuration information.

In an embodiment, the step of operating the operating system kernel to generate the scheduling configuration information according to the microkernel task type weight and the microkernel task priority weight and/or the control program running time weight corresponding to each control program of the control programs includes:

generating the scheduling configuration information according to a microkernel task type, and a microkernel task priority and/or a control program running time of the each control program using a coarse-grained lock scheduling method, where in the coarse-grained lock scheduling method, the each physical core corresponds to one lock, one control program is determined from control programs on a single one of the plurality of physical cores according to a timetable-based scheduling algorithm or a priority-based scheduling algorithm, the control program obtains the lock corresponding to the single one of the plurality of physical cores, exclusively occupies the single one of the plurality of physical cores, and executes a kernel mode operation; or generating the scheduling configuration information according to the microkernel task type, and the microkernel task priority and/or the control program running time of the each control program using a fine-grained lock scheduling method; where in the fine-grained lock scheduling method, the each physical core corresponds to the one lock, control programs are obtained from the at least one control program according to computing resources required by the at least one control program and are configured on respective ones of the plurality of physical cores according to the dependency among control programs, each of the control programs acquires a lock corresponding to the respective one of the plurality of physical cores running the each of the control programs, the control programs having locks concurrently execute the kernel mode operation on the respective ones of the plurality of physical cores running the control programs so as to be executed in parallel.

In an embodiment, the timetable-based scheduling algorithm includes:

setting a plurality of timers, where a duration of a first timer is a main frame time, a second timer is sequentially started for each of a plurality of time windows within the main frame time, and a duration of the second timer is the same as a duration of each of the plurality of time windows successively; and scheduling control programs according to a timetable while starting the first timer and the second timer with the main frame time as a period, scheduling a next one of control programs once the second timer expires, and starting a next period once the first timer expires, wherein the timetable includes start time and end time of each of the plurality of time windows and the respective control programs corresponding to the plurality of time windows.

In an embodiment, the priority-based scheduling algorithm includes:

traversing a priority primary index number bitmap to determine a primary index number corresponding to a highest priority;

traversing a priority secondary index number bitmap corresponding to the primary index number to determine a secondary index number corresponding to the highest priority; and calculating the highest priority based on the primary index number and the secondary index number, and determining a control program corresponding to the highest priority.

In an embodiment, the operating the operating system kernel to generate the scheduling configuration information according to the microkernel task type weight and the microkernel task priority weight and/or the control program running time weight corresponding to each control program of the plurality of control programs includes:

operating the operating system kernel to generate the scheduling configuration information according to the microkernel task type weight, the microkernel task priority weight and/or the control program running time weight corresponding to the each control program, and a service requirement of the each control program.

In an embodiment, the scheduling configuration information further includes a trigger condition and/or service parameter among the control programs.

In an embodiment, the scheduling configuration information further includes a plurality of control subprograms of each control program, one or more physical cores running the control subprograms, and a trigger condition and/or service parameter among the control subprograms. The control subprograms of each control program run on the one or more physical cores.

In an embodiment, the step of operating the operating system kernel to generate the scheduling configuration information according to the microkernel task type weight and the microkernel task priority weight and/or the control program running time weight corresponding to the each control program as well as service requirements of the each control programs further includes:

for the each control program, operating the operating system kernel to divide the each control program into multiple control subprograms according to a resource requirement of the each control program and computing resources of each microkernel; and operating the operating system kernel to generate the scheduling configuration information according to the microkernel task type weight and the microkernel task priority weight and/or the control program running time weight corresponding to each control subprogram, and a service requirements of each control subprogram.

In an embodiment, for each control program, the step of operating the operating system kernel to divide each control program into multiple control subprograms according to the resource requirement of the each control program and computing resources of each microkernel includes:

for the each control program, operating the operating system kernel to divide the each control program into multiple control subprograms according to a computation burden of the each control program and a parameter for weighting computational capability of each microkernel in the plurality of physical cores; or for the each control program, operating the operating system kernel to divide the each control program into multiple control subprograms according to the number of I/O interfaces of the each control program and the number of I/O interfaces of the each microkernel in the plurality of physical cores.

In an embodiment, the step of operating the operating system kernel to generate the scheduling configuration information according to the microkernel task type weight and the microkernel task priority weight and/or the control program running time weight corresponding to each control program of the control programs as well as a service requirement of the each control program includes:

operating the operating system kernel to generate the scheduling configuration information according to the microkernel task type weight and the microkernel task priority weight and/or the control program running time weight corresponding to the each control program, the service requirement of the each control programs, and basic program blocks of the system. The scheduling configuration information further includes: all basic program blocks in each control program, and a trigger condition and/or service parameter among the basic program blocks in each control program.

In the embodiments of the present disclosure and according to a user definition, dependency of control programs is calculated according to a microkernel task type weight and a microkernel task priority weight and/or a control program running time weight prior to startup of a system, the number of control programs running on each physical core is determined according to the dependency, and each control program runs on multiple physical cores according to the dependency. The user-defined configuration is not limited to a single physical core controlling a plurality of microkernel time slices and a single microkernel occupying computing resources to perform an allocation across physical cores. The

DETAILED DESCRIPTION

According to the present disclosure, a single microkernel runs on a single physical core, or the single microkernel can utilize the computing resources of the only single physical core, which results in the inefficient utilization of physical core computing resources, in the embodiments of the present disclosure and according to a user definition, dependency of control programs is calculated according to a microkernel task type weight and a microkernel task priority weight and/or a control program running time weight prior to startup of a system, the number of control programs running on each physical core is determined according to the dependency and each control program runs on multiple physical cores according to the dependency. The user-defined configuration is not limited to a single physical core controlling a plurality of microkernel time slices and a single microkernel occupying computing resources to perform an allocation across physical cores. The present disclosure achieves the real-time control and free combination of microkernels of the industrial server at the industrial site layer.

The embodiments of the present disclosure will be described hereinafter in detail with reference to the accompanying drawings and embodiments. It is to be understood that the specific embodiments described herein are merely to illustrate, but not to limit the embodiments of the present disclosure. It is to be further noted that for convenience of description, only some but not all structures related to the embodiments of the present disclosure are shown in accompanying drawings.

Embodiment 1

Figure 1:
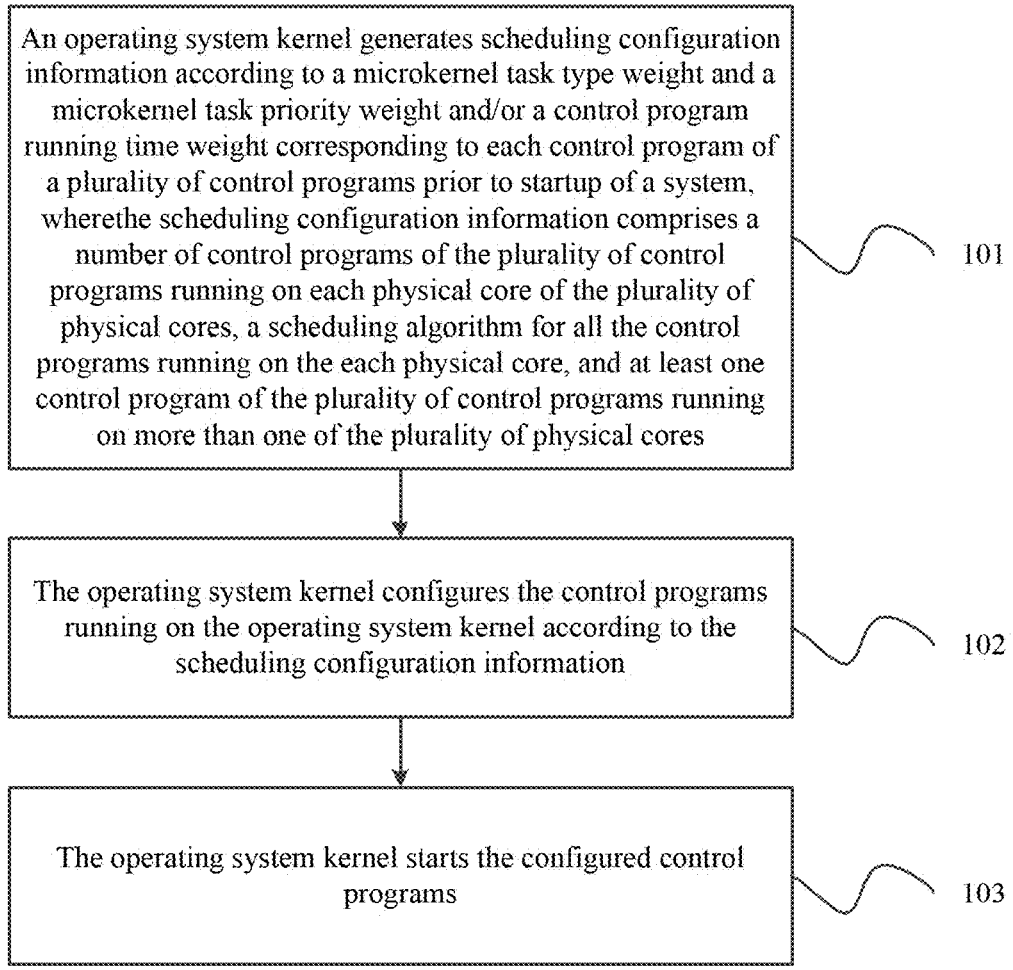
FIG. 1 is a flowchart of a method for implementing microkernel architecture of industrial server according to an embodiment of the present disclosure.
Figure 2:
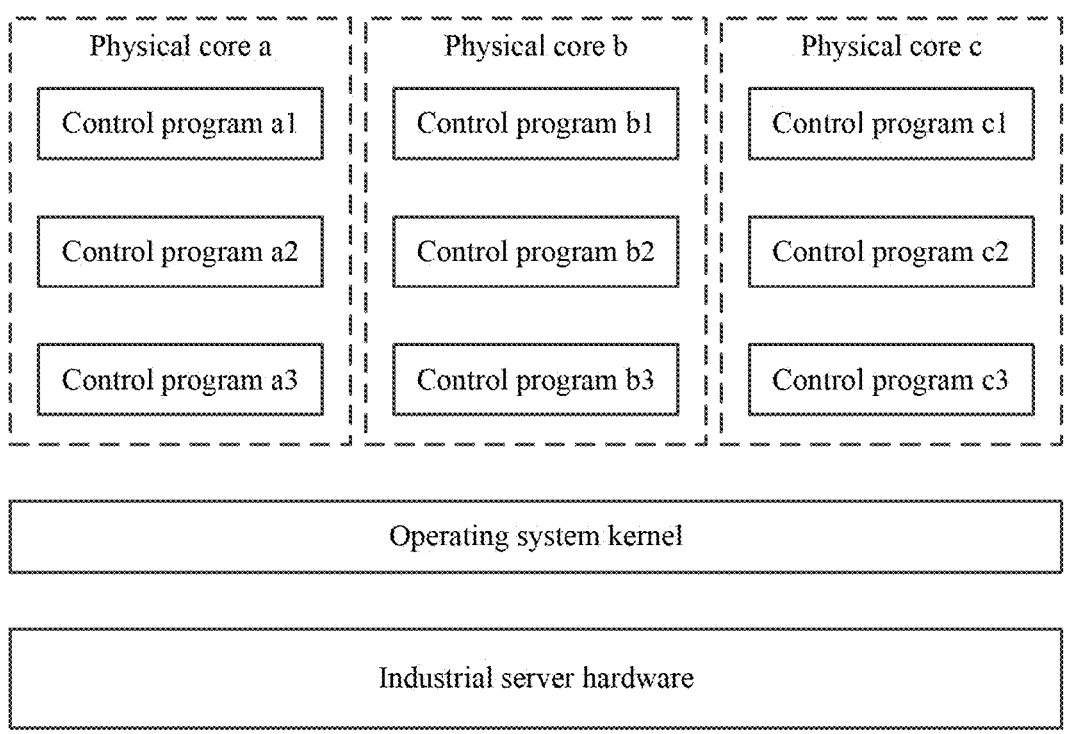
FIG. 2 is a structural diagram of an industrial server according to an embodiment of the present disclosure.

FIG. 1 is a flowchart of a method for implementing microkernel architecture of industrial server according to an embodiment of the present disclosure. FIG. 2 is a structural diagram of an industrial server according to an embodiment of the present disclosure. It is can be seen that the industrial server includes: industrial server hardware, an operating system kernel based on the industrial server hardware, and a plurality of physical cores supported by the operating system kernel. A plurality of virtual machines may run on each physical core, and each virtual machine corresponds to one microkernel. Control programs run on the microkernels, that is, more than one control program may run on each physical core. In order to have multiple control programs running on one physical core, the embodiment of the present disclosure employs the virtualization technology to obtain multiple virtualized microkernels on the basis of the operating system. The control programs running on respective microkernels are scheduled by the operating system kernel. In an example, among a total of three physical cores a, b, and c, three control programs a1, a2 and a3 run on the physical core a, three control programs b1, b2 and b3 run on the physical core b, and three control programs c1, c2 and c3 run on the physical core c.

In the present embodiment, a kernel is a microkernel when part of content of services is removed from the kernel to outside. A microkernel operating system provides only the most basic and necessary services in the kernel, such as Inter-Process Communication (IPC), memory management and task scheduling. Other services, including drivers, file systems and networks, are implemented in the user mode. The service components run in respective independent address spaces instead of sharing an address space. Most microkernel operating systems process requests through message transmission between service modules. For example, a module sends a request for more memory space and transmits the request through the kernel to the service that processes the request. After the processing of the request is completed, a result is transmitted back through the kernel.

The method for implementing microkernel architecture of industrial server in the present embodiment may be performed by an operating system kernel, and is specifically performed by a virtual machine monitor running on the operating system kernel. The method includes the steps described below.

In step 101, the operating system kernel generates scheduling configuration information according to a microkernel task type weight and a microkernel task priority weight and/or a control program running time weight corresponding to each control program of multiple control programs prior to startup of a system; where the scheduling configuration information includes the number of control programs running on each physical core, a scheduling algorithm for all the control programs running on each physical core, and at least one control program running on more than one physical cores.

In the present embodiment, each physical core may have multiple control programs running thereon. These control programs have a same running period or different running periods. In an example, with reference to FIG. 2, three control programs run on each of physical cores a, b and c. Specifically, three control programs a1, a2 and a3 run on the physical core a; three control programs b1, b2 and b3 run on the physical core b; and three control programs c1, c2 and c3 run on the physical core c. Control programs a1, a2 and a3 may have the same running period, control programs b1, b2 and b3 may have different running periods, and running periods of control programs c1 and c2 are the same but are different from the running period of c3. The control programs running on each physical core may be scheduled with a configured scheduling algorithm. The scheduling algorithm includes a timetable-based scheduling algorithm or a priority-based scheduling algorithm. Different physical cores may be configured with different scheduling algorithms. One control program may run on one or more physical cores. It can be seen that multiple control programs may run on one physical core, where each of the control programs may be a control program with complete functions or a control program with part of functions of one control program; when one control program is configured to run on multiple physical cores, the control program runs independently on each physical core, that is, the control program participates in the scheduling of each physical core running the control program; and different physical cores may be configured with different scheduling algorithms and do not affect each other.

An operating system kernel calculates the dependency of control programs according to the microkernel task type weight corresponding to each control program, and the microkernel task priority weight corresponding to each control program and/or the control program running time weight corresponding to each control program, and generates scheduling configuration information according to the dependency. The calculation of the dependency includes: calculating the dependency according to the microkernel task type weight, the microkernel task priority weight and the control program running time weight; or calculating the dependency according to the microkernel task type weight and the microkernel task priority weight; or calculating the dependency according to the microkernel task type weight and the control program running time weight. The microkernel task corresponding to a control program refers to a task for running the control program of the microkernel. The running time corresponding to a control program refers to a time slice allocated for the control program.

As mentioned above, each physical core may have multiple control programs running thereon. The control programs have a same running period or different running periods. That is, the control programs shares one physical core, and when one of the control programs needs to execute a kernel mode operation, the physical core serves this control program. In order to exclusively use the physical core, any control program that needs to execute the kernel mode operation is required to apply for a lock. Only the control program that has the lock can use the physical core to execute the kernel mode operation. According to the granularity size of computing resources required by the control programs, scheduling methods are classified into a coarse-grained lock scheduling method and a fine-grained lock scheduling method.

Figure 3:
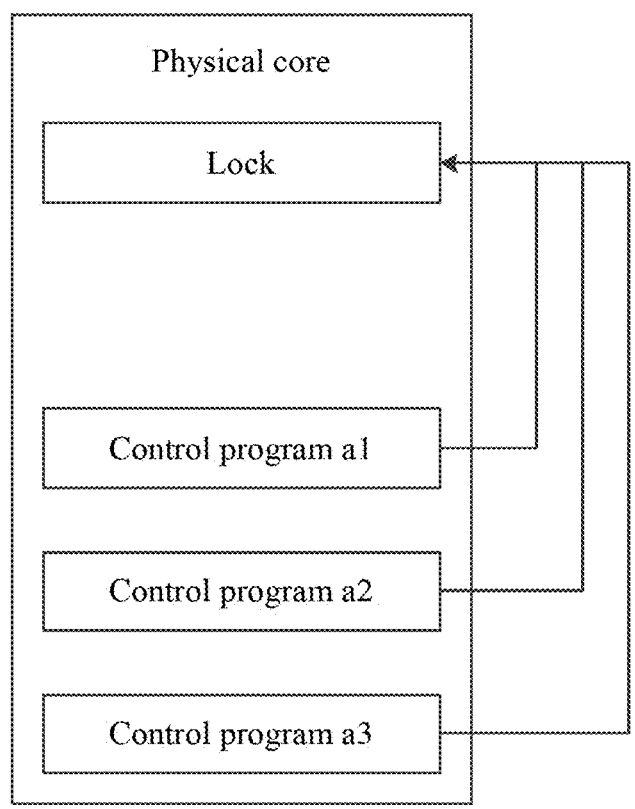
FIG. 3 is a schematic diagram of coarse-grained lock scheduling according to an embodiment of the present disclosure.

FIG. 3 is a schematic diagram of coarse-grained lock scheduling according to an embodiment of the present disclosure. The coarse-grained lock scheduling refers to that one physical core corresponds to one lock and the control program that has the lock exclusively occupies the entire physical core. Therefore, only one control program uses the physical core to execute the kernel mode operation at a time. Other control programs that need to execute the kernel mode operation can only wait to be scheduled to acquire the lock.

When a coarse-grained lock scheduling method is adopted, the scheduling algorithm for the control programs on a single physical core includes the timetable-based scheduling algorithm or the priority-based scheduling algorithm. In an example, with reference to FIG. 2, there are a total of three physical cores a, b and c. Each physical core corresponds to one lock and the coarse granularity means that scheduling within a physical core is carried out on the basis of one complete control program. Three control programs a1, a2 and a3 run on the physical core a, and only one control program can use the physical core to execute the kernel mode operation at a time. The scheduling may be carried out among control programs a1, a2 and a3 on the basis of the timetable-based scheduling algorithm or the priority-based scheduling algorithm, to determine which control program acquires the lock of the physical core a. Similarly, the scheduling may be carried out among three control programs b1, b2 and b3 running on the physical core b, and among three control programs c1, c2 and c3 running on the physical core c in the above-mentioned way, so as to acquire the right of use of the locks corresponding to respective physical cores and then to occupy the physical core to execute the kernel mode operation.

Figure 4:
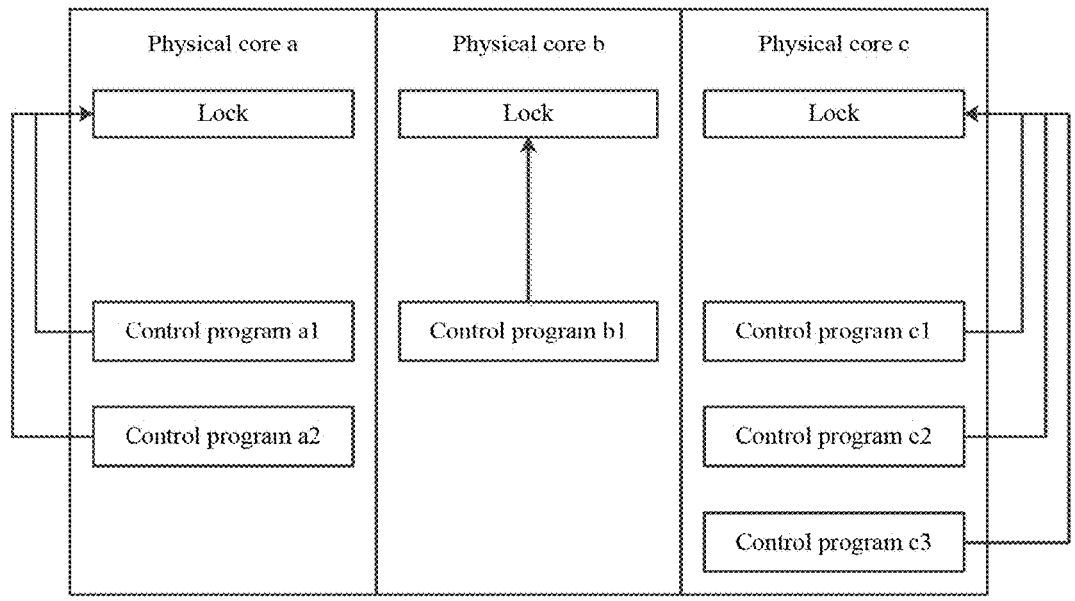
FIG. 4 is a schematic diagram of fine-grained lock scheduling according to an embodiment of the present disclosure.

FIG. 4 is a schematic diagram of fine-grained lock scheduling according to an embodiment of the present disclosure. When a control program needs a large number of computing resources of a kernel service, a kernel mode operation of the control program may be performed by multiple physical cores jointly. The single control program is divided into a plurality of control programs according to different control program granularities and the control programs are allocated to different physical cores. The physical cores simultaneously execute the kernel mode operation, such that the plurality of control programs is executed concurrently. According to the task type of each microkernel, control programs may be classified into a plurality of types, including Inter-Process Communication (IPC), memory management and task scheduling. The present embodiment adopts a two-layer clipping algorithm to clip and classify control programs. The first layer clipping algorithm clips the plurality of control programs into the least schedulable program sets, each lasting several periods, according to running time, which reduces the system overhead for scheduling control programs. The second layer clipping algorithm, based on the results of control program clipping on the first layer, further clips control programs into several control programs sets with different priority levels, which allows control programs to run in a more reliable and more real-time environment. Finally, dependency of the plurality of control programs is calculated. The calculation process may be performed in combination with the microkernel task type weight and the microkernel task priority weight and/or the control program running time weight. Control programs with high dependency are combined and allocated to the same physical core, and control programs with low dependency are allocated to different physical cores. The plurality of physical cores jointly executes the kernel mode operation to complete the control programs.

The clipping algorithm provided by the present embodiment is not limited to the two-layer clipping algorithm, and may further include the algorithm described below. For a control program, multiple control programs are obtained from the control program, and are clipped into several control programs with different priority levels, which allows the control programs to run in a more reliable and more real-time environment. Finally, the dependency of the plurality of control programs is calculated, the calculation process may be performed in combination with the microkernel task type weight and the microkernel task priority weight and/or the control program running time weight. Control programs with high dependency are combined and allocated to the same physical core, and control programs with low dependency are allocated to different physical cores. The plurality of physical cores jointly executes the kernel mode operation to complete control programs.

In an example, with reference to FIG. 2, there are a total of three physical cores a, b and c. Each physical core corresponds to one lock and the fine granularity means that the plurality of control programs originate from one control program and then the plurality of control programs are allocated to different physical cores according to dependency between the control programs, each physical core scheduling a control program and other control programs together. Control programs b1, b2 and b3 run on the physical core b and control programs c1, c2 and c3 run on the physical core c, where b1 and b2 originate from a same control program, and c1 and c2 originate from a same control program. As mentioned above, the control programs may be split by using a two-layer clipping algorithm or other algorithms, and, according to the dependency, allocation is performed among physical cores where the control programs are located. That is, b1 and b2 are allocated to the same physical core b due to their high dependency, and c1 and c2 are allocated to the same physical core c due to their high dependency. Therefore, after the allocation based on the granularity of control programs, a same control program is allocated to two physical cores. Control programs within each physical core may be scheduled using the timetable-based scheduling algorithm or the priority-based scheduling algorithm, and a control program that acquires the right to use the lock will occupies the physical core to execute the kernel mode operation.

In an embodiment, the plurality of control programs corresponding to one control program are clipped into several control programs with different lengths of running time, which allows the control programs to run in a more reliable and more real-time environment. Finally, the dependency of the plurality of control programs is calculated, the calculation process may be performed in combination with the microkernel task type weight and the microkernel task priority weight and/or the control program running time weight. Control programs with high dependency are combined and allocated to the same physical core, and control programs with low dependency are allocated to different physical cores. The plurality of physical cores jointly executes the kernel mode operation to complete the control programs.

In general, control programs to be performed at the industrial site layer include, but are not limited to: temperature measurement and control, humidity measurement and control, and process control. The dependency herein means that when the above-mentioned control program is implemented on microkernels, it is determined that control programs corresponding to the above-mentioned control program are completed on the basis of the microkernels. In fact, a micro control process acquired through a preset algorithm may be an industrial control process in accordance with the industrial site, or may be a user-defined industrial control process.

In the preset algorithm, for example, different weights are set for microkernel task type, running time and priority of a control program, and these weights are added up. The different sums of the weights, which are in a certain range, are considered to correspond to a same control program. The dependency is calculated through the preset algorithm, and control programs with high dependency are combined to determine the number of control programs running on each physical core and each control program running on the plurality of physical cores.

The scheduling configuration information includes the number of control programs running on each physical core, the scheduling algorithm for all the control programs running on each physical core, and at least one control program running on more than one physical core. In the present embodiment, after it is determined which control programs are allocated to which physical cores according to the above method, scheduling configuration information is generated. In an example, with reference to FIG. 2, three control programs run on each of physical cores a, b and c. Specifically, three control programs a1, a2 and a3 run on the physical core a; three control programs b1, b2 and b3 run on the physical core b; and three control programs c1, c2 and c3 run on the physical core c. The physical core a determines from three control programs a1, a2, and a3 one control program currently executing the kernel mode operation by using the timetable-based scheduling algorithm. The physical core b determines from three control programs b1, b2, and b3 one control program currently executing the kernel mode operation by using the priority-based scheduling algorithm. The physical core c determines from three control programs c1, c2, and c3 one control program currently executing the kernel mode operation by using the priority-based scheduling algorithm. The control programs b1, b2, c1 and c2 originating from one control program run on two physical cores b and c respectively.

In step 102, the operating system kernel configures the control programs running on the operating system kernel according to the scheduling configuration information.

The operating system kernel virtualizes hardware through a virtual machine monitoring program, and configures the control programs on one of the plurality of physical cores according to the scheduling configuration information; and/or the operating system kernel configures the scheduling algorithm for the control programs running on the each of the plurality of physical cores according to the scheduling configuration information, the scheduling algorithm including a timetable-based scheduling algorithm or a priority-based scheduling algorithm; and/or the operating system kernel virtualizes the plurality of physical cores, obtains the control programs originating from at least one control program of all the control programs and configures the control programs on more than one the plurality of physical cores according to the scheduling configuration information.

The operating system kernel may actually configure control programs running on the operating system kernel according to the scheduling configuration information. In an example, with reference to FIG. 2, three control programs run on each of physical cores a, b and c. Specifically, three control programs a1, a2 and a3 run on the physical core a; three control programs b1, b2 and b3 run on the physical core b; and three control programs c1, c2 and c3 run on the physical core c. The physical core a determines from three control programs a1, a2, and a3 one control program currently executing the kernel mode operation by using the timetable-based scheduling algorithm. The physical core b determines from three control programs b1, b2, and b3 one control program currently executing the kernel mode operation by using the priority-based scheduling algorithm. The physical core c determines from three control programs c1, c2, and c3 one control program currently executing the kernel mode operation by using the priority-based scheduling algorithm. The control programs b1, b2, c1 and c2 originating from one control program run on two physical cores b and c respectively.

In step 103, the operating system kernel starts the configured control programs.

After performing the configuration described above, the operating system kernel starts the configured control programs. In an example, with reference to FIG. 2, nine control programs are configured on three physical cores and are scheduled according to the scheduling algorithms corresponding to the respective physical cores.

In the present embodiment, each physical core may have multiple control programs running thereon, which improves the utilization of resources of the physical core; control programs with different periods may run on the same physical core, which achieves the free combination of control programs across a plurality of physical cores and the multi-service software-defined free scheduling; and different scheduling algorithms for control programs may be configured for different physical cores freely, which improves the flexibility and diversity of the scheduling of control programs.

In the present embodiment, prior to startup of a system, scheduling configuration information is generated according to the microkernel task type weight and the microkernel task priority weight and/or the control program running time weight corresponding to control programs, the number and the scheduling algorithm of the control programs running on each physical core and at least one control program running on more than one of the plurality of physical cores are configured according to the scheduling configuration information. A user-defined configuration is not limited to a single physical core controlling a plurality of microkernel time slices and a single microkernel occupying computing resources to perform an allocation across physical cores. The present disclosure achieves the real-time control and free combination of the microkernel control of the industrial server at the industrial site layer, and improves the utilization of the computing resources of the physical cores.

Embodiment 2

On the basis of the above, a timetable-based scheduling algorithm includes: setting a plurality of timers, where a duration of a first timer is a main frame time, a second timer is sequentially started for each of a plurality of time windows within the main frame time, and the duration of the second timer is the same as the duration of each time window, successively; and scheduling control programs according to a timetable while starting the first timer and the second timer with a main frame time as a period, scheduling a next control program once the second timer expires, and starting a next period once the first timer expires, where the timetable includes start time and end time of each of the plurality of time windows and the respective control programs corresponding to the time windows.

Figure 5:
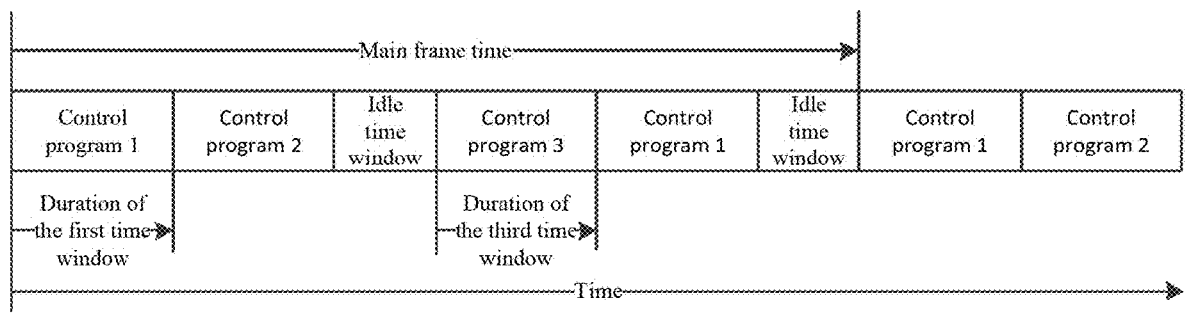
FIG. 5 is a schematic diagram of a timetable according to an embodiment of the present disclosure.

In the present embodiment, control programs running on a physical core are scheduled according to the configured timetable. The timetable may be pre-configured according to requirements. The scheduling is performed by taking a main frame time as a period, the main frame including multiple time windows. The timetable includes start time and end time of the each time windows, as well as a control programs corresponding to each time window. The time windows are classified into non-idle time windows and idle time windows. Each non-idle time window corresponds to the running time of one control program, and no control program runs in the idle time window. When control programs are scheduled, the main frame time is repeatedly executed, that is, every time the timetable is finished, the first time window of the timetable will be executed anew. FIG. 5 is a schematic diagram of a timetable according to the embodiment of the present disclosure. In this timetable, the first non-idle time window is the running time of the control program 1, the second non-idle time window is the running time of the control program 2, the third non-idle time window is the running time of the control program 3, and the fourth non-idle time window is again the running time of the control program 1. The main frame time is the total duration of the six time windows of FIG. 5. Users may configure, according to actual requirements, the duration of each time window and the control programs running in each time window. The durations of the time windows may be configured to be the same or different.

However, since the timetable-based scheduling algorithm adopts the system clock, interruption may occur at small time intervals. The frequent occurrence of interruption may introduce delay to time windows of the timetable. For example, suppose that the main frame time of the timetable is 500 ms and the non-idle time window corresponding to the control program 1 is 100 ms, and suppose that the interruption processing time is 1 ms, if 10 interruptions occur during the running of the control program 1, then a delay of 10 ms is introduced, that is, the control program 1 runs for 110 ms before switching to the control program 2. Accordingly, when the main frame time of 500 ms expires, it is actually still in the last time window of the timetable and it will not switch back to the first time window of the timetable until 510 ms expires, resulting in a delay of 10 ms for main frame switching. To avoid the delay for control program switching and main frame switching, the plurality of timers are set in the present embodiment. The first timer is used for timing the main frame time to control the switching of the main frame time, and the second timer is used for timing the time windows to control the switching of the time windows. With reference to FIG. 5, when a main frame starts, the first timer and the second timer are started at the same time, the control program 1 corresponding to the first time window in the timetable is scheduled. At the moment, the duration of the second timer is the same as that of the first time window. When the second timer expires, the first time window in the timetable is switched to the adjacent second time window and the control program 2 corresponding to the second time windows is scheduled. At the moment, the duration of the second timer is as same as the duration of the second time window. The rest can be done in the same manner. When the first timer reaches expires, a next main frame period is started, that is, the control program 1 corresponding to the first time window in the timetable is scheduled again. At the moment, the current time window, no matter which time window it is, switches to the first time window of the timetable, the first timer and the second timer are reset and restart, thereby achieving synchronization of the main frame time.

Embodiment 3

On the basis of the above, the priority of control programs running on one or more physical cores are acquired, and is represented by an 8-bit binary number, where the most significant 3 bits represent a primary index number, and the least significant 5 bits represent a secondary index number. The corresponding bits in the priority primary index number bitmap are marked according to the primary index number, and the corresponding bits in the priority secondary index number bitmap are marked according to the secondary index number.

Figure 6:
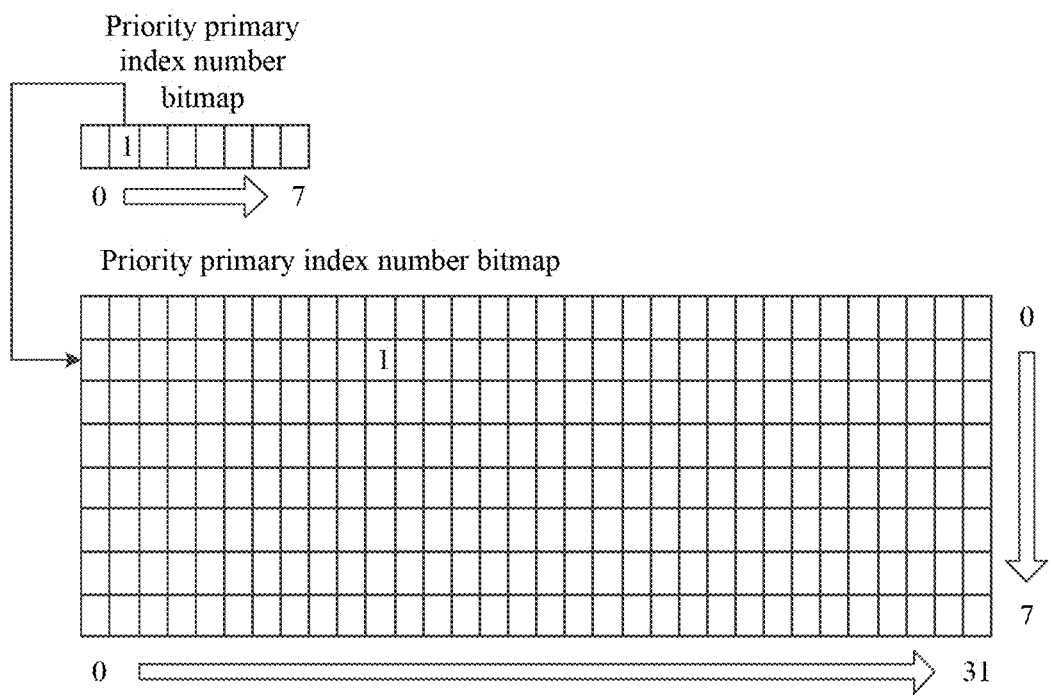
FIG. 6 is a schematic diagram of a priority index number bitmap according to an embodiment of the present disclosure.

In the present embodiment, each control program may be provided with a priority, which may be set in a range from 0 to 255, where 0 corresponds to the highest priority and 255 corresponds to the lowest priority. Each control program may be in different states such as ready, wait, pending, suspend or hibernate. Only a control program in the ready state can be scheduled, and control programs in other states are not included in the list of objects to be scheduled. Each priority is represented by an 8-bit binary number, where the most significant 3 bits represent a primary index number, and the least significant 5 bits represent a secondary index number. For example, a control program with priority of 42, which is represented by a binary number 00101010, is in the ready state. The most significant 3 bits are 001(1) and the least significant 5 bits are 01010(10). The primary index number corresponding to the priority 42 is 1, and the secondary index number corresponding to the priority 42 is 10. FIG. 6 is a schematic diagram of a priority index number bitmap according to an embodiment of the present disclosure. The priority primary index number bitmap is a 1×8 one-dimensional bitmap, in which the positions are numbered from 0 to 7. The priority secondary index number bitmap is an 8×32 two-dimensional bitmap, in which the positions are numbered from 0 to 7 in vertical direction and from 0 to 31 in horizontal direction. The position numbered as 1 in the priority primary index number bitmap has a mark (of 1) according to the primary index number 1 corresponding to the priority 42; the position numbered as 1 in vertical direction and 10 in horizontal direction in the priority primary index number bitmap has a mark (of 1) according to the secondary index number corresponding to the priority 42.

On the basis of the above, a priority-based scheduling algorithm includes: traversing a priority primary index number bitmap to determine a primary index number corresponding to a highest priority; traversing a priority secondary index number bitmap corresponding to the primary index number to determine a secondary index number corresponding to the highest priority; calculating the highest according to the primary index number and the secondary index number, and determining a control program corresponding to the highest priority.

With reference to FIG. 6, the priority primary index number bitmap is traversed in the order of 0 to 7 to find that the first position with the mark of 1 is numbered as 1; then the priority secondary index number bitmap is traversed in the order of 0 to 31 to find that the first position, which has the mark of 1 and is numbered as 1 in vertical direction, is numbered as 10 in horizontal direction. According to the composition of the priority, the highest priority of the control program is 42 in this case.

Embodiment 4

Figure 7:
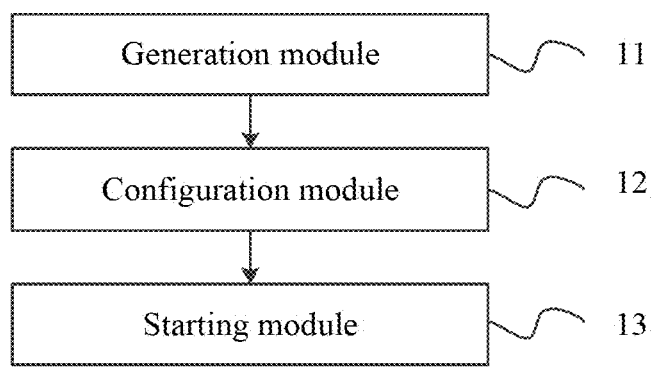
FIG. 7 is a flow chart of a method for implementing microkernel architecture of industrial server according to an embodiment 4 of the present disclosure.

FIG. 7 is a flow chart of a method for implementing microkernel architecture of industrial server according to an embodiment 4 of the present disclosure. In the embodiment, the operating system kernel generates scheduling configuration information according to a microkernel task type weight, a microkernel task priority weight and/or a control program running time weight corresponding to each control program and a service requirement of each control program. With reference to FIG. 7, the method specifically includes steps described below.

In step S710, before a system starts, an operating system kernel generates scheduling configuration information according to a microkernel task type weight, a microkernel task priority weight and/or a control program running time weight corresponding to each control program and a service requirement of each control program.

In an embodiment, the service requirement of each control program includes a procedure requirement, a data requirement and a function requirement of each control program. In this embodiment, the service requirement of each control program is provided, in addition to the microkernel task type weight, the microkernel task priority weight and/or the control program running time weight, to serve as the base for generating the scheduling configuration information. In a specific implementation mode, the operating system kernel may generate the scheduling configuration information according to the microkernel task type weight, the microkernel task priority weight and the control program running time weight corresponding to each control program, and the service requirement of each control program. Alternatively, the operating system kernel may generate the scheduling configuration information according to the microkernel task type weight and the microkernel task priority weight corresponding to each control program, and the service requirement of each control program. Alternatively, the operating system kernel may generate the scheduling configuration information according to the microkernel task type weight and the control program running time weight corresponding to the control programs, and the service requirement of each control program. The service requirement of each control program may be control logic, control task, control target and the like to be implemented by the control program. Particularly, in a distributed control system, the service requirement of each control program may be used in the analysis for the cooperation relationship such as a trigger condition among the control programs and a service parameter or data to be transmitted among the control programs. In order to determine the physical core or the physical cores to run the control programs and the number of control programs running on each physical core, the microkernel task type weight, the microkernel task priority weight and the service requirement of the control programs may be combined to calculate the dependency of multiple control programs. Control programs having high dependency are combined and configured on a same physical core, and control programs having low dependency are configured on different physical cores.

The scheduling configuration information includes the number of control programs running on each physical core, scheduling algorithms for control programs running on each physical core and the each control program running on multiple physical cores.

In step S720, the operating system kernel configures the control programs running on the operating system kernel according to the scheduling configuration information.

In step S730, the operating system kernel starts the configured control programs.

In this embodiment, the operating system kernel generates the scheduling configuration information according to the microkernel task type weight, the microkernel task priority weight and the control program running time weight corresponding to the control programs, and the service requirement of the control programs. In this way, the system can start according to the service requirement of the control programs, and implement the inter-service and intra-service cooperation among the control programs and the device cooperation among control subprograms running on different physical cores on the basis of microkernel architecture. Here, each control subprogram in the device cooperation forms a complete control program.

In an optional implementation mode, one or more physical cores have multiple control programs running thereon, and a service requirement exists among the control programs. As such, the scheduling configuration information includes the number of control programs running on each physical core, a scheduling algorithm for all control programs running on each physical core, at least one control program running on multiple physical core, and a trigger condition among control programs and/or a service parameter delivered among control programs. The microkernel architecture is adopted for implementing inter-service cooperation. If multiple control programs run on different physical cores, the device cooperation among physical cores is implemented. The trigger condition among control programs may be interpreted to be a condition satisfied by a control program A when triggering running of another control program B, which is in cooperation with the control program A. The service parameter delivered among control programs may be interpreted to be a service parameter required for the running of a control program B and delivered from a control program A to the control program B, which is in cooperation with the control program A. In an embodiment, the scheduling configuration information further includes information indicating to a control program the physical core for running another control program in cooperation with the control program, and a trigger condition required for triggering the another control program in cooperation and/or a trigger parameter required to be delivered to the another control program in cooperation. Here, cooperation may refer to the cooperation between one control program and another control program, or may refer to the cooperation between a control subprogram of one control program and a control subprogram of another control program.

One physical core may have one or more control programs running thereon; the one or more control programs may specifically run on one or more PLCs of one or more microkernels. In a case of multiple control programs running on one physical core, with reference to FIG. 2, three control programs a1, a2 and a3 run on the physical core a. The scheduling algorithm of the 3 control programs includes a timetable-based scheduling algorithm or a priority-based scheduling algorithm. This has been illustrated in the above embodiments and will not be repeated. It is assumed that every two control programs among the 3 control programs are in cooperation. The trigger condition and the service parameter include, for example, a trigger condition satisfied by the control program a1 to trigger the running of the control program a2; a trigger condition satisfied by the control program a2 to trigger the running of the control program 3; an operation result of the control program a1 and a service parameter that are delivered from the control program a1 to the control program a2 and are required for the running of the control program a2; and an operation result of the control program a2 and a service parameter that are delivered from the control program a2 to the control program a3 and are required for the running of the control program a3. In the case of one physical core running one control program, with reference to FIG. 2, the physical core a runs the control program a1, the physical core b runs the control program b1, the scheduling algorithm of the control programs a1 and b1 includes a timetable-based scheduling algorithm or a priority-based scheduling algorithm. Since the control programs a1 and b1 are in cooperation, the trigger condition and the service parameter include, for example, a trigger condition satisfied by the control program a1 to trigger the running of the control program b1, and an operation result of the control program a1 and a service parameter that are delivered from the control program a1 to the control program b1 and are required for the running of the control program b1.

Figure 8:
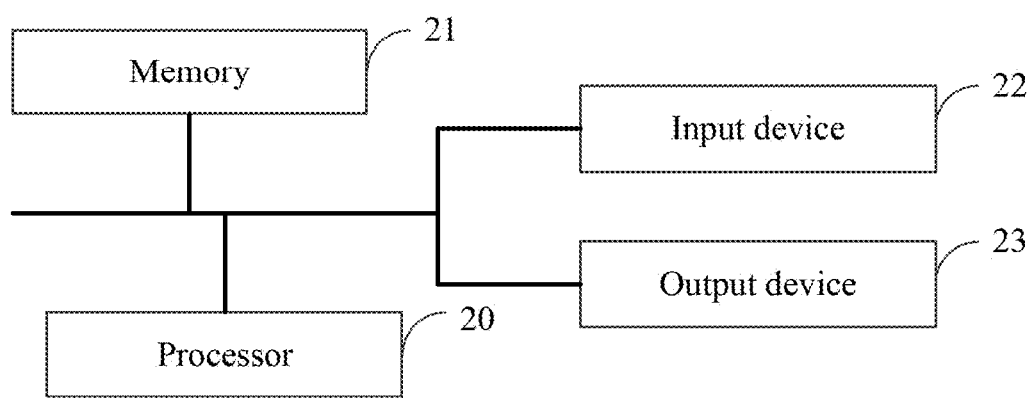
FIG. 8 is a schematic diagram of cooperation among control programs according to an embodiment of the present disclosure.

The trigger condition and/or service parameter among control programs are illustrated in detail in an application scenario with reference to FIG. 8.

FIG. 8 illustrates control programs A and B. The dash line represents the flow direction of the trigger condition, and the solid line represents the flow direction of the service parameter. Before startup of a system, the trigger condition and the service parameter are generated in advance and the control programs A and B are configured. In this way, the control programs A and B automatically implements the inter-service cooperation according to the configuration. It should be noted that after a triggered control program starts running, the triggering control program may stop running or continue to run. The specific running manner of a control program is determined by the service requirement of the control program.

In an example, the control program A is used for controlling a conveyer belt, and the control program B is used for controlling a grabbing mechanical arm. When a certain condition is satisfied, the control program for the conveyer belt needs to start the control program for the grabbing mechanical arm to grab. Therefore, before the startup of the system, the control program for the conveyer belt is configured, so as to start the control program for the grabbing mechanical arm to grab when the condition is satisfied. In case that the control program of the conveyer belt need to inform the speed and force of the grabbing action to the control program for the grabbing mechanical arm, the control program for the conveyer belt so as to start the control program for the grabbing mechanical arm to grab when the condition is satisfied. In addition, the speed and force of the grabbing action may be configured to the control program for the grabbing mechanical arm in advance.

In another example, the control program A is used for charging, and the control program B is used for heating. When the temperature of water contained in a container reaches a preset condition, the control program for charging needs to perform charging; and when the temperature does not reach the preset condition, the control program for heating is started to heat the water in the container. Before the startup of the system, the control program for charging is configured in advance in such a manner that when the temperature of the water drops below a preset condition, the control program for heating is started to heat the water in the container. In addition, the temperature range of the water may be configured to the control program for heating in advance.

In another optional embodiment mode, there is at least one control program, and each control program may be divided into multiple control subprograms. As such, the scheduling configuration information further includes control subprograms of each control program, at least one physical core running the control subprograms, and a trigger condition and/or service parameter among the control subprograms. The control subprograms of each control program run on at least one physical core. The microkernel architecture is adopted for implementing inter-service cooperation. The trigger condition among control subprograms may be interpreted to be a condition satisfied by a control subprogram A when triggering running of another control subprogram B, which is in cooperation with the control subprogram A. The service parameter delivered among control subprograms may be interpreted to be a service parameter required for the running of a control subprogram B and delivered from a control subprogram A to the control subprogram B, which is in cooperation with the control subprogram A. If multiple control subprograms of one control program run on different physical cores, the device cooperation among physical cores is implemented. In an embodiment, the scheduling configuration information further includes information indicating to a control program one or more physical cores for running another control program in cooperation with the control program, and a trigger condition required for triggering the control program in cooperation and/or a trigger parameter required to be sent to the control program in cooperation. The control subprograms in cooperation here constitute a complete control program.

It should be noted that one physical core may run control subprograms of different control programs, or control subprograms of a same control program.

For the control subprograms of each control program, one physical core may have one or more control subprograms running thereon; the one or more control subprograms may specifically run on on one or more PLCs of one or more microkernels. In a case of one physical core with one or more control subprograms running thereon, with reference to FIG. 2, the physical core a have three control subprograms a1, a2 and a3 running, and three control subprograms constitute one control program. The scheduling algorithm of the 3 control subprograms includes a timetable-based scheduling algorithm or a priority-based scheduling algorithm. The trigger condition and the service parameter include, for example, a trigger condition satisfied by the control subprogram a1 to trigger the running of the control subprogram a2; a trigger condition satisfied by the control subprogram a2 to trigger the running of the control subprogram 3; an operation result of the control subprogram a1 and a service parameter which are delivered from the control subprogram a1 to the control subprogram a2 and are required for the running of the control subprogram a2; and an operation result of the control subprogram a2 and a service parameter which are delivered from the control subprogram a2 to the control subprogram a3 and are required for the running of the control subprogram a3. In the case of one physical core having one control subprogram running thereon, with reference to FIG. 2, the physical core a runs the control subprogram a1, the physical core b runs the control subprogram b1, the scheduling algorithm of the control subprograms a1 and b1 includes a timetable-based scheduling algorithm or a priority-based scheduling algorithm. The trigger condition and the service parameter include, for example, a trigger condition satisfied by the control subprogram a1 to trigger the running of the control subprogram b1, and an operation result of the control subprogram a1 and a service parameter delivered from the control subprogram a1 to the control subprogram b1 and are required for the running of the control subprogram b1.

Figure 9:
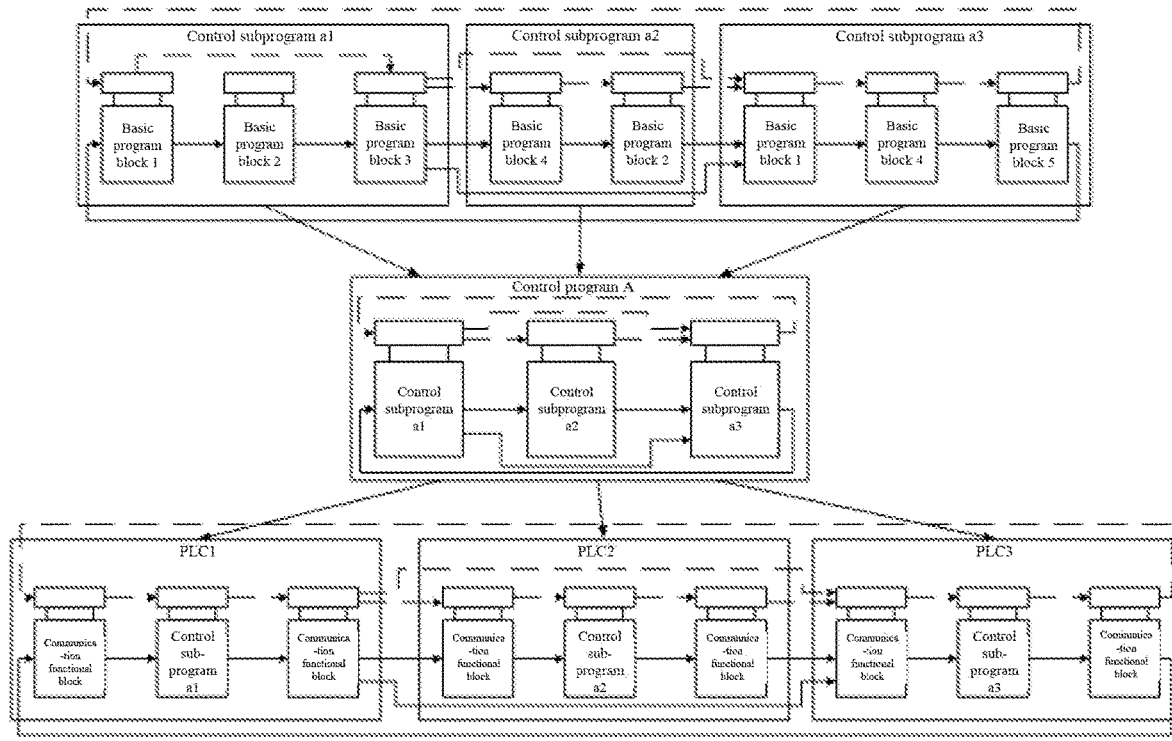
FIG. 9 is a schematic diagram of cooperation among control subprograms according to an embodiment of the present disclosure.

The trigger condition and/or service parameter among control subprograms are illustrated in detail in an application scenario with reference to FIG. 9.

In FIG. 9, the control program A includes control subprogram a1, a2 and a3. The control subprogram a1 is configured on a PLC1 of a physical core a, the control subprogram a2 is configured on a PLC2 of a physical core b, and the control subprogram a3 is configured on a PLC3 of a physical core c. In an embodiment, each of the physical cores further includes a communication functional block. The communication functional block is used for delivering the trigger condition and the service parameter among the control subprograms, and is equivalent to "input" or "output" of each PLC in the procedure of the control program. The dash line represents the flow direction of the trigger condition, and the solid line represents the flow direction of the service parameter. Before the startup of a system, the trigger condition and the service parameter are generated in advance and the control subprograms a1, a2 and a3 are configured, such that the control subprograms a1, a2 and a3 automatically implement the device cooperation among the physical cores. It should be noted that after a triggered control subprogram starts running, the triggering control subprogram may stop running or continue to run. The specific running manner of a control subprogram is determined by the service requirement of the control subprogram.

For example, in the pre-configuration, an initial value of the control subprogram a1 is configured, an operation result of the control subprogram a1 serves as a trigger condition of the control subprogram a2, the operation result of the control subprogram a1 and an operation result of the control subprogram a2 serve as a trigger condition of the control subprogram a3, and the operation result of the control subprogram a1 serves as a trigger condition of the control subprogram a1.

Specifically, the control subprogram a1 performs calculation based on the initial value preconfigured and delivers the operation result to the control subprograms a2 and a3 through the communication functional block. The control subprogram a2 performs calculation based on the operation result of the control subprogram a1 received through the communication functional block. The control subprogram a3 performs calculation based on the operation results of the control subprograms a1 and a2 received through the communication functional block and obtains a final result.

In an embodiment, one control program may be divided into multiple control subprograms in various manners, for example, the two-layer clipping algorithm in above embodiments. In this implementation mode, the control program is divided into control subprograms according to the resource requirement of the control program and the computing resource provided by the microkernel. As such, the step in which the operating system kernel generates scheduling configuration information according to a microkernel task type weight, a microkernel task priority weight and/or a control program running time weight corresponding to control programs and a service requirement of each control program further includes that the operating system kernel divides each control program into multiple control subprograms according to resource requirements of the control programs and computing resources provided by the microkernel; and the operating system kernel generates the scheduling configuration information according to the microkernel task type weight and the microkernel task priority weight and/or the control program running time weight corresponding to each control subprogram, and service requirement of each control subprogram.

The resource requirements of the control programs include computation burden of each control program or the number of I/O interfaces of each control program. The computation burden of each control program includes memory size, the number of instructions and the number of processes. Accordingly, the computation resources provided by the microkernel include a parameter for weighting computational capability or the number of I/O interfaces. The parameter for weighting computational capability includes memory size, basic frequency, storage space and the like. As such, the operating system kernel divides the control program into multiple control subprograms according to the computation burden of the control program and the parameter for weighting computational capability provided by the microkernel in each physical core. Alternatively, the operating system kernel divides the control program into multiple control subprograms according to the number of I/O interfaces of the each control program and the number of I/O interfaces of the microkernel in each physical core.

In addition, after the control program is divided, the dependency of I/O interfaces of the control subprograms is calculated. This dependency of I/O interfaces may be weighted by means of the number of I/O interfaces among control subprograms in direct connection. The control subprograms with dependency of I/O interfaces higher than a preset dependency threshold are configured on a same physical core or on multiple physical cores close to each other geologically, so as to shorten the distance of data transmission.

In yet another implementation mode, there may be at least one control program, and each control program includes at least one basic program block. The basic program block is the minimal software unit for executing control logic, and is ultimately manifested as input/output of the trigger condition and input/output of the service parameter. The basic program blocks of the control program and the trigger condition and/or service parameter among the basic program blocks may be generated and configured prior to the startup of the system. In an embodiment, the step in which the operating system kernel generates the scheduling configuration information according to the microkernel task type weight and the microkernel task priority weight and/or the control program running time weight corresponding to each control program as well as a service requirement of each control program includes that the operating system kernel generates the scheduling configuration information according to the microkernel task type weight and the microkernel task priority weight and/or the control program running time weight corresponding to each control program, the service requirement of each control program, and basic program blocks of the system. The scheduling configuration information further includes all basic program blocks in each control program, and a trigger condition and/or service parameter among the basic program blocks in each control program, so as to implement the intra-service cooperation. The trigger condition among basic control programs may be interpreted to be a condition satisfied by a basic control program A when triggering running of another basic control program B, which is in cooperation with the basic control program A. The service parameter delivered among basic control programs may be interpreted to be a service parameter required for the running of a basic control program B and delivered from a basic control program A to the basic control program B, which is in cooperation with the basic control program A.

Generally, as shown in FIGS. 8 and 9, the basic program blocks are included in the control subprograms or the control program. In an example as shown in FIG. 9, the control subprogram a1 includes basic program blocks 1, 2 and 3, and the control subprogram a2 includes basic program blocks 4 and 2. In another example as shown in FIG. 8, the control program A includes basic program blocks 1, 4 and 5, and the control program B includes basic program blocks 2, 4 and 1. It can be seen that one basic program block may be reused in different control subprograms or control programs. Accordingly, it is the control subprogram or control program including a basic program block which determines the location where the basic program block is configured on the physical cores. The location of the control subprograms or control program is illustrated in the above embodiments and will not be repeated here.

Figure 10:
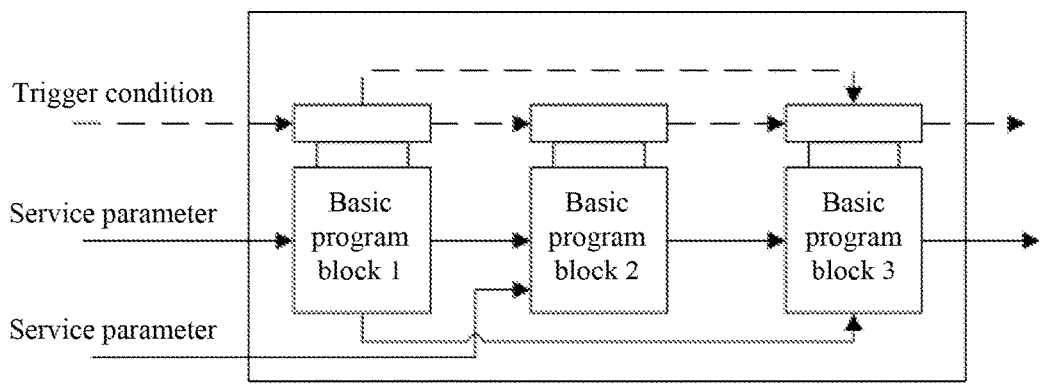
FIG. 10 is a schematic diagram of cooperation among basic program blocks according to an embodiment of the present disclosure.

With reference to FIGS. 8, 9 and 10, the dash line between basic program blocks represents the flow direction of the trigger condition, and the solid line between basic program blocks represents the flow direction of the service parameter. Before the startup of the system, the basic program blocks corresponding to each control program is selected in advance, and the trigger condition and service parameter among the basic program blocks are generated. After that, the basic program blocks are configured and then start automatically. In this way, the entire control program is implemented.

In FIG. 10, the basic program blocks (e.g., basic program blocks 1, 2 and 3) included in the control program are configured in advance, and the initial values of the basic program blocks 1 and 2 are configured. Furthermore, the operation result of the basic program block 1 serves as the trigger condition of the basic program block 2, and the operation results of the basic program blocks 1 and 2 serve as the trigger condition of the basic program block 3.

The basic program block 1 performs calculation based on the initial value preconfigured and delivers the operation result to the basic programs 2 and 3. The basic program block 2 performs calculation based on the initial value preconfigured and the operation result of the basic program block 1, and delivers the operation result to the basic program block 3. The basic program block 3 performs calculation based on the operation results of the basic program blocks 2 and 1 and obtains an operation result of the control program.

Embodiment 5

Figure 11:
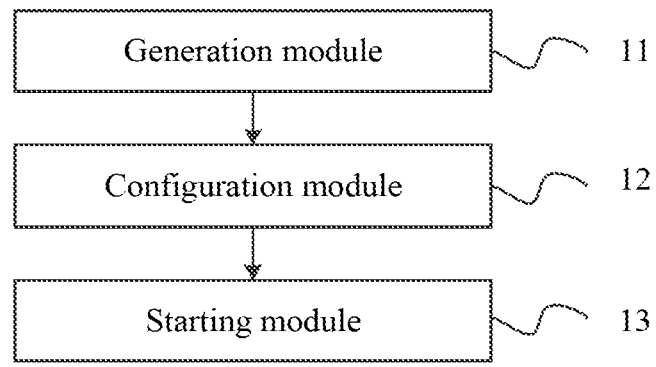
FIG. 11 is a structural diagram of an apparatus for implementing microkernel architecture of industrial server according to an embodiment of the present disclosure.

FIG. 11 is a structural diagram of an apparatus for implementing microkernel architecture of industrial server according to an embodiment of the present disclosure. The apparatus is disposed in an industrial server shown in FIG. 2 and includes a generating module 11, a configuration module 12 and a starting module 13. The generating module 11 is used for, prior to startup of a system, generating scheduling configuration information according to a microkernel task type weight and a microkernel task priority weight and/or a control program running time weight corresponding to control programs. The scheduling configuration information includes the number of control programs running on each physical core, scheduling algorithms for control programs running on each physical core, and each control program running on multiple physical cores. The configuration module 12 is used for configuring control programs running on the operating system kernel according to the scheduling information. The starting module 13 is used for starting the configured control programs.

The apparatus for implementing microkernel architecture of industrial server provided by the embodiment of the present disclosure is capable of performing the method for implementing microkernel architecture of industrial server according to any embodiment of the present disclosure and has functional modules and beneficial effects corresponding to the method.

Embodiment 6

Figure 12:
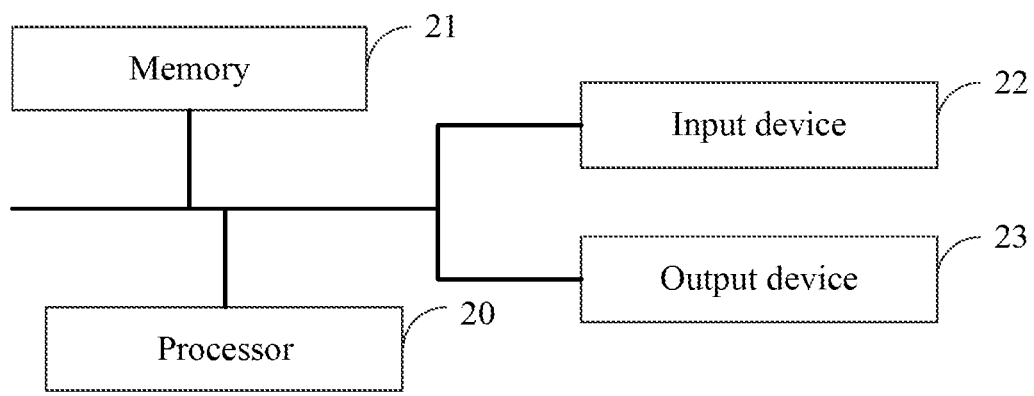
FIG. 12 is a structural diagram of an industrial server according to an embodiment of the present disclosure.

FIG. 12 is a structural diagram of an industrial server according to an embodiment of the present disclosure. As shown in FIG. 8, the industrial server includes a processor 20, a memory 21, an input device 22 and an output device 23. The number of processors 20 in the industrial server may be one or more and one processor 20 is taken as an example in FIG. 8. The processor 20, the memory 21, the input device 22 and the output device 23 in the industry server may be connected through a bus or in other ways. In FIG. 8, the connection through a bus is taken as an example.

As a computer-readable storage medium, the memory 21 is used for storing software programs and computer-executable programs and modules, such as program instructions/modules corresponding to the method for implementing microkernel architecture of industrial server in the embodiments of the present disclosure. The processor 20 runs software programs, instructions and modules stored on the memory 21 to execute various function applications and data processing of the industrial server, that is, to implement the method for implementing microkernel architecture of an industrial server.

The memory 21 may mainly include a program storage area and a data storage area. The program storage area may store an operating system and an application program required for implementing at least one function while the data storage area may store data created depending on use of terminals. In addition, the memory 21 may include a high-speed random access memory, and may also include a nonvolatile memory, such as at least one click memory, flash memory or another nonvolatile solid-state memory. In some examples, the memory 21 may further include memories that are remotely disposed with respect to the processor 20. These remote memories may be connected to the industrial server via a network. The network includes, but is not limited to, the Internet, an intranet, a local area network, a mobile communication network and a combination thereof.

The input device 22 may be used for receiving inputted digital or character information and for generating key signal input related to user settings and function control of the industrial server. The output device 23 may include a display device such as a display screen.

Embodiment 7

Embodiments of the present disclosure further provide a storage medium containing executable instructions. The executable instructions, when executed by a processor, execute related operations in the method for implementing microkernel architecture of industrial server provided by any embodiment of the present disclosure.

From the above description of embodiments, it will be apparent to those skilled in the art that the embodiments of the present disclosure may be implemented by means of software and necessary general-purpose hardware, or may of course be implemented by hardware, but in many cases the former is a preferred. Based on this understanding, the present disclosure substantially may be embodied in the form of a software product. The software product is stored in a computer-readable storage medium, such as a computer floppy disk, a Read-Only Memory (ROM), a Random Access Memory (RAM), a flash memory, a hard disk or an optical disk, and includes instructions for enabling a computer device (which may be a personal computer, a server or a network device) to execute the method according to each embodiment of the present disclosure.

It is to be noted that units and modules involved in the embodiment of the above mentioned apparatus are just divided according to functional logic, and the division is not limited to this, as long as the corresponding functions can be realized. In addition, the specific names of the each functional unit are just intended for distinguishing, and are not to limit the protection scope of the embodiments of the present disclosure.

It is to be noted that the above are only preferred embodiments of the present disclosure and the technical principles used therein. It will be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure.

What is claimed is:

1. A method for implementing microkernel architecture of industrial server, wherein the method is applied to an industrial server, an operating system kernel based on industrial server hardware in the industrial server supports a plurality of physical cores, and the method comprises:

operating an operating system kernel to generate scheduling configuration information according to a microkernel task type weight and a microkernel task priority weight and/or a control program running time weight corresponding to each control program of a plurality of control programs prior to startup of a system, wherein the scheduling configuration information comprises a number of control programs of the plurality of control programs running on each physical core of the plurality of physical cores, a scheduling algorithm for all the control programs running on the each physical core, and at least one control program of the plurality of control programs running on more than one of the plurality of physical cores;

operating the operating system kernel to configure the plurality of control programs running on the operating system kernel according to the scheduling configuration information; and operating the operating system kernel to start the configured control programs, wherein operating the operating system kernel to generate the scheduling configuration information according to the microkernel task type weight and the microkernel task priority weight and/or the control program running time weight corresponding to the each control program of the plurality of control programs comprises:

generating the scheduling configuration information according to a microkernel task type, and a microkernel task priority and/or a control program running time of the each control program using a coarse-grained lock scheduling method, wherein in the coarse-grained lock scheduling method, the each physical core corresponds to one lock, one control program is determined from the control programs on a single one of the plurality of physical cores according to a timetable-based scheduling algorithm or a priority-based scheduling algorithm, the control program obtains the lock corresponding to the single one of the plurality of physical cores, exclusively occupies the single one of the plurality of physical cores, and executes a kernel mode operation; or generating the scheduling configuration information according to a microkernel task type, and the microkernel task priority and/or the control program running time of the each control program using a fine-grained lock scheduling method, wherein in the fine-grained lock scheduling method, the each physical core corresponds to one lock, control programs is are obtained from the at least one control program according to computing resources required by the at least one control program and are configured on the respective ones of the plurality of physical cores according to the dependency among the control programs, each of the control programs acquires a lock corresponding to the respective one of the plurality of physical cores running the each of the control programs, the control programs having locks concurrently execute the kernel mode operation on the respective ones of the plurality of physical cores running the control programs so as to be executed in parallel.

2. The method according to claim 1, wherein operating the operating system kernel to configure the plurality of control programs running on the operating system kernel according to the scheduling configuration information comprises:
  virtualizing hardware through a virtual machine monitoring program, and configuring more than one of the plurality of control programs on at least one of the plurality of physical cores according to the scheduling configuration information; and/or
  configuring the scheduling algorithm for all the control programs running on the each physical core according to the scheduling configuration information, wherein the scheduling algorithm comprises a timetable-based scheduling algorithm or a priority-based scheduling algorithm; and/or
  virtualizing the plurality of physical cores, obtaining at least two control programs from each of the at least one control program and configuring the obtained at least two control programs originating from each of the at least one control program on more than one of the plurality of physical cores according to the scheduling configuration information.

3. The method according to claim 2, wherein the timetable-based scheduling algorithm comprises:
  setting a plurality of timers, wherein a duration of a first timer is a main frame time, a second timer is sequentially started for each of a plurality of time windows within the main frame time, and a duration of the second timer is the same as a duration of each of the plurality of time windows successively; and
  scheduling the control programs according to a timetable while starting the first timer and the second timer with the main frame time as a period, scheduling a next one of the control programs once the second timer expires, and starting a next period once the first timer expires, wherein the timetable includes start time and end time of each of the plurality of time windows and the respective control programs corresponding to the plurality of time windows.

4. The method according to claim 1, wherein operating the operating system kernel to generate the scheduling configuration information according to the microkernel task type weight and the microkernel task priority weight and/or the control program running time weight corresponding to the each control program of the plurality of control programs includes:
  operating the operating system kernel to generate the scheduling configuration information according to the microkernel task type weight, the microkernel task priority weight and/or the control program running time weight corresponding to the each control program, and a service requirement of the each control program.

5. The method according to claim 4, wherein the scheduling configuration information further includes a trigger condition and/or service parameter among the plurality of control programs.

6. The method according to claim 4, wherein the scheduling configuration information further includes a plurality of control subprograms of the each control program, at least one physical core running the control subprograms, and a trigger condition and/or service parameter among the control subprograms; wherein the control subprograms of the each control program run on the at least one physical core.

7. The method according to claim 6, wherein operating the operating system kernel to generate the scheduling configuration information according to the microkernel task type weight, the microkernel task priority weight and/or the control program running time weight corresponding to the each control program, and the service requirement of the each control program includes:
  for the each control program, operating the operating system kernel to divide the each control program into the plurality of control subprograms according to a resource requirement of the each control program and computing resources of each microkernel; and
  operating the operating system kernel to generate the scheduling configuration information according to the microkernel task type weight and the microkernel task priority weight and/or the control program running time weight corresponding to each control subprogram of the plurality of control subprograms, and a service requirement of the each control subprogram.

8. The method according to claim 7, wherein for the each control program, operating the operating system kernel to divide the each control program into the plurality of control subprograms according to the resource requirement of the each control program and the computing resources of each microkernel includes:
  for the each control program, operating the operating system kernel to divide the each control program into the plurality of control subprograms according to a computation burden of the each control program and a parameter for weighting computational capability of each microkernel in the plurality of physical cores; or
  for the each control program, operating the operating system kernel to divide the each control program into the plurality of control subprograms according to a number of I/O interfaces of the each control program and a number of I/O interfaces of the each microkernel in the plurality of physical cores.

9. The method according to claim 4, wherein operating the operating system kernel to generate the scheduling configuration information according to the microkernel task type weight, the microkernel task priority weight and/or the control program running time weight corresponding to the each control program, and the service requirement of the each control program includes:
  operating the operating system kernel to generate the scheduling configuration information according to the microkernel task type weight and the microkernel task priority weight and/or the control program running time weight corresponding to the each control program, the service requirement of the each control program and a plurality of basic program blocks of the system,
  wherein the scheduling configuration information further includes: all basic program blocks in the each control program, and a trigger condition and/or service parameter among the basic program blocks in the each control program.

10. An apparatus for implementing microkernel architecture of industrial server, wherein the apparatus is integrated in an industrial server, an operating system kernel based on industrial server hardware in the industrial server supports a plurality of physical cores, wherein the apparatus comprises:
a processor; and
a memory for storing instructions executable to the process,
wherein the processor is configured to:
generate scheduling configuration information according to a microkernel task type weight and a microkernel task priority weight and/or a control program running time weight corresponding to each control program of a plurality of control programs prior to startup of a system, wherein the scheduling configuration information comprises a number of control programs of the plurality of control programs running on each physical core of the plurality of physical cores, a scheduling algorithm for all the control programs running on the each physical core, and at least one control program of the plurality of control programs running on more than one of the plurality of physical cores;
configure the plurality of control programs running on the operating system kernel according to the scheduling configuration information; and
start the configured control programs,
wherein in the generation of the scheduling configuration information according to the microkernek task type weight and the microkernel task priority weight and/or the control program running time weight corresponding to the each control program of the plurality of control programs, the processor is configured to;
generate the scheduling configuration information according to a microkernel task type, and a microkernel task priority and/or a control program running time of the each control program using a coarse-grained lock scheduling method, wherein in the coarse-grained lock scheduling method, the each physical core corresponds to one lock, one control program is determined from the control programs on a single one of the plurality of physical cores according to a timetable-based scheduling algorithm or a priority-based scheduling algorithm, the control program obtains the lock corresponding to the single one of the plurality of physical cores, exclusively occupies the single one of the plurality of physical cores, and executes a kernel mode operation; or
generate the scheduling configuration information according to the microkernel task type, and the microkernel task priority and/or the control program running time of the each control program by using a fine-grained lock scheduling method, wherein in the fine-grained lock scheduling method, the each physical core corresponds to the one lock, control programs are obtained from the at least one control program according to computing resources required by the at least one control program and are configured on respective ones of the plurality of physical cores according to the dependency among the control programs, each of the control programs acquires a lock corresponding to the respective one of the plurality of physical cores running the each of the control programs, the control programs having locks concurrently execute the kernel mode operation on the respective ones of the plurality of physical corres running the control programs so as to bee executed in parallel.

11. The apparatus according to claim 10, in the configuration of the plurality of control programs running on the operating system kernel according to the scheduling configuration information, the processor is configured to:
virtualize hardware through a virtual machine monitoring program, and configure more than one of the plurality of control programs on at least one of the plurality of physical cores according to the scheduling configuration information; and/or
configure the scheduling algorithm for all the control programs running on the each physical core according to the scheduling configuration information, wherein the scheduling algorithm comprises a timetable-based scheduling algorithm or a priority-based scheduling algorithm; and/or
virtualize the plurality of physical cores, obtain at least two control programs from each of the at least one control program and configure the obtained at least two control programs originating from each of the at least one control program on more than one of the plurality of physical cores according to the scheduling configuration information.

12. The apparatus according to claim 11, wherein the timetable-based scheduling algorithm comprises:
setting a plurality of timers, wherein a duration of a first timer is a main frame time, a second timer is sequentially started for each of a plurality of time windows within the main frame time, and a duration of the second timer is the same as a duration of each of the plurality of time windows successively; and
scheduling the control programs according to a timetable while starting the first timer and the second timer with the main frame time as a period, scheduling a next one of the control programs once the second timer expires, and starting a next period once the first timer expires, wherein the timetable includes start time and end time of each of the plurality of time windows and the respective control programs corresponding to the plurality of time windows.

13. The apparatus according to claim 10, wherein in the generation of the scheduling configuration information according to the microkernel task type weight and the microkernel task priority weight and/or the control program running time weight corresponding to the each control program of the plurality of control programs, the processor is configured to:
generate the scheduling configuration information according to the microkernel task type weight, the microkernel task priority weight and/or the control program running time weight corresponding to the each control program, and a service requirement of the each control program.

14. The apparatus according to claim 13, wherein the scheduling configuration information further includes a trigger condition and/or service parameter among the plurality of control programs.

15. The apparatus according to claim 13, wherein the scheduling configuration information further includes a plurality of control subprograms of the each control program, at least one physical core running the control subprograms, and a trigger condition and/or service parameter among the control subprograms; wherein the control subprograms of the each control program run on the at least one physical core.

16. The apparatus according to claim 15, wherein in the generation of the scheduling configuration information according to the microkernel task type weight, the microkernel task priority weight and/or the control program running time weight corresponding to the each control program, and the service requirement of the each control program, the processor is configured to:

for the each control program, divide the each control program into the plurality of control subprograms according to a resource requirement of the each control program and computing resources of each microkernel; and generate the scheduling configuration information according to the microkernel task type weight and the microkernel task priority weight and/or the control program running time weight corresponding to each control subprogram of the plurality of control subprograms, and a service requirement of the each control subprogram.

17. The apparatus according to claim 16, wherein for the each control program, in the division of the each control program into the plurality of control subprograms according to the resource requirement of the each control program and the computing resources of each microkernel, the processor is configured to:

for the each control program, divide the each control program into the plurality of control subprograms according to a computation burden of the each control program and a parameter for weighting computational capability of each microkernel in the plurality of physical cores; or for the each control program, divide the each control program into the plurality of control subprograms according to a number of I/O interfaces of the each control program and a number of I/O interfaces of the each microkernel in the plurality of physical cores.

18. The apparatus according to claim 13, wherein in the generation of the scheduling configuration information according to the microkernel task type weight, the microkernel task priority weight and/or the control program running time weight corresponding to the each control program, and the service requirement of the each control program, the processor is configured to:

generate the scheduling configuration information according to the microkernel task type weight and the microkernel task priority weight and/or the control program running time weight corresponding to the each control program, the service requirement of the each control program and a plurality of basic program blocks of the system, wherein the scheduling configuration information further includes: all basic program blocks in the each control program, and a trigger condition and/or service parameter among the basic program blocks in the each control program.

* * * * *